May 17, 1966  J. W. ENNIS  3,251,388

MITERING AND KERFING MACHINE

Filed April 27, 1964

INVENTOR.
JAMES W. ENNIS
BY John R. Walker III
Attorney

United States Patent Office 3,251,388
Patented May 17, 1966

3,251,388
MITERING AND KERFING MACHINE
James W. Ennis, 1384 Black Bass Cove, Memphis, Tenn.
Filed Apr. 27, 1964, Ser. No. 362,808
7 Claims. (Cl. 144—3)

This invention relates to a machine adapted to cut frame members or the like for mitered corner joints and to kerf the members for spline fastenings at the joints.

The present invention provides certain improvements over the mitering and kerfing machine disclosed in my United States Patent No. 2,917,089, issued December 15, 1959.

In the machine of the above-mentioned patent, two pieces of material, as door casing stock, were clamped on the machine in back-to-back relationship, and the pieces were mitered and kerfed simultaneously to form right and left-hand ends on the workpieces. The mitering and kerfing operations in this prior machine were done by mitering saw means and kerfing saw means which were somewhat separate one from the other in that each had its own carriage and carriage drive. Also, the two carriages were separately and sequentially movable toward each other and toward the workpiece in the mitering and kerfing operations, thus necessitating two separate control means and one for each carriage drive.

The machine of the present invention, like the above-mentioned machine, also is preferably adapted to process two workpieces at once and to form mating right and left-hand end joints respectively on each workpiece. This invention, however, seeks to simplify and improve the machine of the prior invention and has a primary object to provide a relatively simple machine which has only one carriage for mounting the mitering and kerfing saw means, has only one drive means for moving the carriage, and has only a single manually operable control for controlling the carriage drive and the mitering and kerfing mechanisms of the machine.

A further object is to provide a machine which can be operated quickly and with the mitering and kerfing operations being sequentially done as the carriage moves in one direction, thus providing a machine operable to process a relatively large number of workpieces in a given length of time.

A further object is to provide a durable and sturdy machine which consistently, accurately miters and kerfs the ends of the workpieces, thus assuring proper fitting joints.

A further object is to provide an easily operable machine which does not require considerable practice to operate proficiently.

A further object is generally to improve the design and construction of mitering and kerfing machines.

The means by which the foregoing and other objects of the present invention are accomplished and the manner of their accomplishment will be readily understood from the following specification upon reference to the accompanying drawings, in which.

Figure 1:
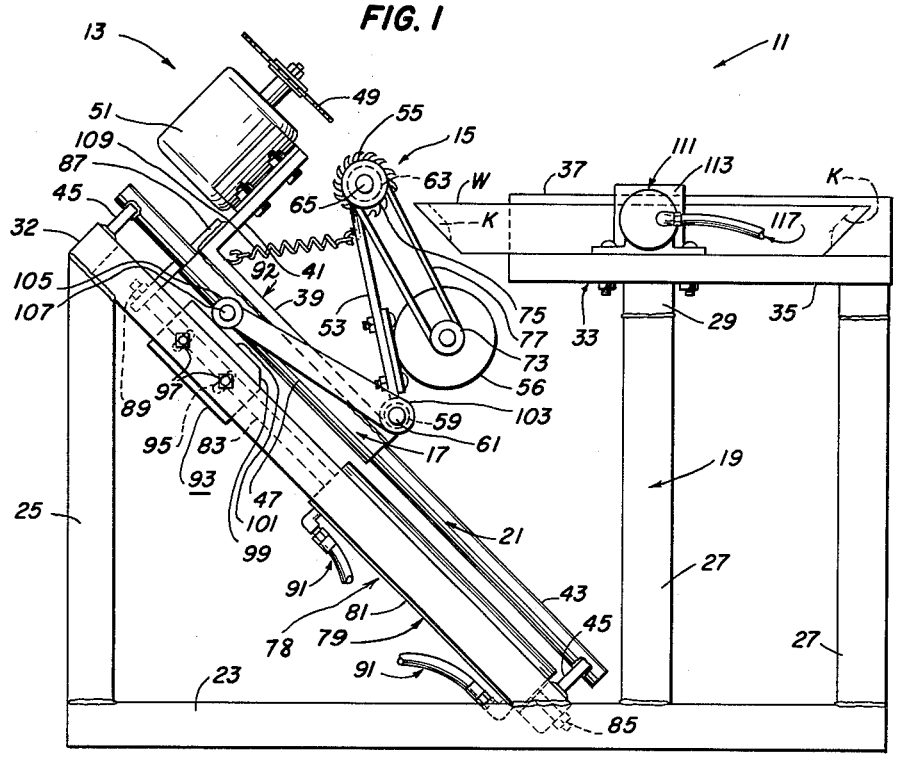
FIG. 1 is a side elevational view of the present invention shown as in use and processing two workpieces of material (only one workpiece being shown) and with the carriage being shown in an upward or forward position.
Figure 2:
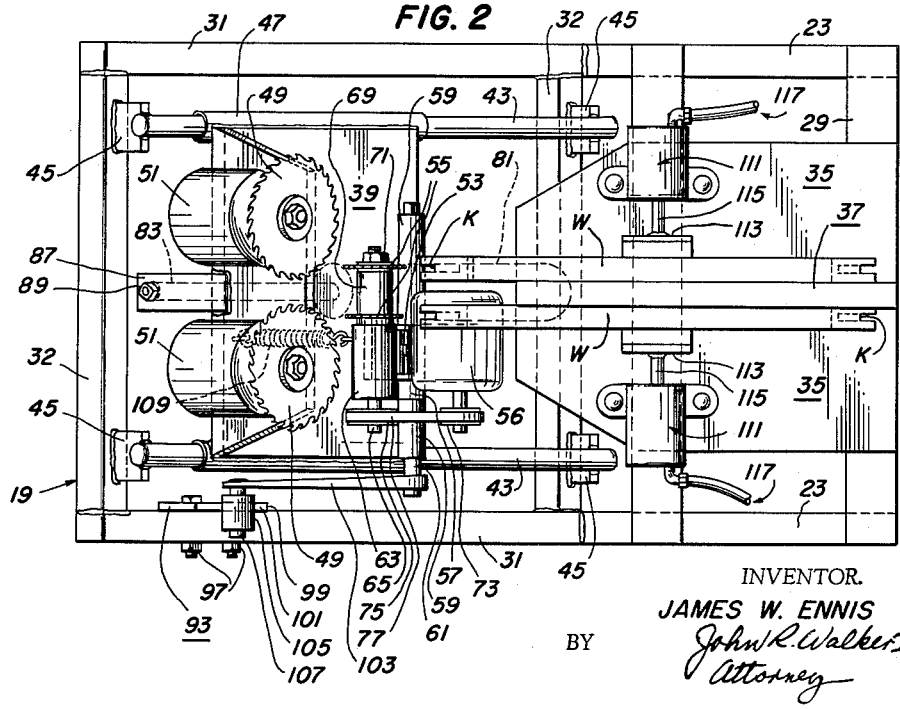
FIG. 2 is a top plan view of the machine as seen in FIG. 1.

Referring now to the drawings in which the various parts are indicated by reference characters, the machine of the present invention, indicated as at 11, is shown processing a pair of workpieces W. Machine 11 includes mitering saw means, indicated generally as at 13, and kerfing saw means, indicated generally as at 15. The mitering saw means 13 and the kerfing saw means 15 are both mounted on a carriage 17. A frame 19 slidably supports carriage 17 on a track 21.

In the description of the machine of the present invention, forwardly and rearwardly will be deemed to mean toward the left and right, respectively, in the drawings. The mitering and kerfing means are thus disposed forwardly on frame 19 and, upon movement of carriage 17 along track 21, act on the forward ends of workpieces W.

Frame 19 is preferably of open construction and formed of hollow rectangular section members which include paired longitudinal base members 23, upright members 25, 27, transversely disposed top members 29, angular members 31, and cross-members 32. The forwardly disposed pair of upright members 25, the pair of angular members 31, and the forward portions of base members 23 support the mitering and kerfing mechanisms of the device; and the upright member 27, the rearwardly disposed portions of base members 23, and the top members 29 support the workpiece positioning means and the workpieces W as they are processed.

The workpiece positioning means includes workpiece support and guide structure, indicated as at 33. Support and guide structure 33 preferably includes a horizontally disposed table member 35 and a vertically disposed rail member 37. Table member 35 is preferably of laminated wood or other such suitable material, and is fixedly attached by suitable means to the top members 29 of frame 19. Rail member 37 is of rectangular cross-section and is of a length substantially co-extensive with the length of table member 35. Suitable means, not shown, fixedly attach rail member 37 longitudinally and intermediate the width of table member 35. Clamping means is provided for removably clamping the pair of workpieces W and will be described in detail further in the specification.

Carriage 17 is preferably formed of flat metal plate material and includes a base part 39 and an upright part 41. Base part 39 and upright part 41 are preferably right-angularly formed, as best seen in FIG. 1. Carriage 17 is movably mounted from frame 19 on track 21, which track preferably is as follows: A pair of cylindrical rods 43 are fixedly attached to frame 19 and preferably extend along angular members 31. Cylindrical rods 43 are preferably attached by brackets 45 disposed adjacent the respective ends of rods 43 and fixedly attached to cross-members 32 of frame 19. A pair of cylindrical tube members 47 are fixedly attached to the undersurface of base part 39 of carriage 17. Tube members 47 fit respectively on cylindrical rods 43 and slidably mount carriage 17 to frame 19.

It should be noted that the angular disposition of track 21 determines the angle of the miter cuts on the workpieces W. Moreover, the angle of track 21 is determined by the angle of the track from the workpiece support and guide structure 33 of the machine; that is, the position in which workpieces W are held is determined substantially by the support and guide structure 33 and particularly the upper surface of table member 35 which supports the bottom edges of the workpieces. Although a 45 degree angle is shown for track 21 for cutting workpieces of material on a 45 degree miter, it is to be understood that this angle is variable to suit a desired miter cut and for joining two workpieces at various angles other than a right angle.

Mitering saw means 13 of the machine 11 preferably includes a pair of saw means mounted side-by-side forwardly on carriage 17. Each of the saw means preferably includes a circular saw blade 49 rotatably driven and mounted from an electric motor 51 which, in turn, is fixedly attached to the upright part 41 of carriage 17. It will be understood that, in the mounting of the pair of mitering saw means from carriage 17, the respective saw blades 49 of each should be in a common plane, and this plane should be parallel to the path of carriage 17 and parallel to track 21.

Kerfing saw means 15 is movably mounted from carriage 17 and disposed rearwardly of mitering saw means 13. Kerfing saw means 15 preferably comprises a support structure 53 pivotally mounted from carriage 17, a pair of kerfing saw blades 55 rotatably mounted on support structure 53, and an electric motor 56 supported from support structure 53 for driving the pair of saw blades 55.

Support structure 53 is preferably rectangularly formed of plate material and is movably disposed substantially over base part 39 of carrage 17. The pivot means pivotally mounting support structure 53 from carriage 17 is preferably as follows: A cylindrical pivot bearing 57 is fixedly attached parallel with and along the lower edge of support structure 53. A pair of like cylindrical pivot bearings 59 are disposed respectively adjacent the opposite ends of pivot bearing 57 and fixedly attached along the lower edge portion of base part 39 of carriage 17. A pivot shaft 61 extends respectively through pivot bearings 58, 59 and pivotally mounts support structure 53 from carriage 17.

The means rotatably mounting saw blades 55 from support structure 53 is preferably as follows: A tubular housing 63 is fixedly attached along the upper edge of support structure 53. A blade shaft 65 is turnably mounted in tubular housing 63 on bearings, not shown. The pair of saw blades 55 are fixedly mounted on the inward end of shaft 65 in spaced arrangement by spacer 69 and nut 71.

Electric motor 56 is mounted on the rearward side on support structure 53 and preferably adjacent the lower end thereof. Motor 56 is mounted transversely of support structure 53 and is provided with a drive pulley 73 on the motor shaft. A driven pulley 75 is provided on blade shaft 65 at the end thereof remote from saw blades 55. A belt 77 connects pulleys 73, 75 and drivingly engages electric motor 56 with the pair of saw blades 55. Although the connections are not shown in the drawings, it is to be understood that the pair of motors 51 of mitering saw means 13 and the motor 56 of kerfing saw means 15 are connected through suitable switch means to a source of electrical current.

First actuating means is provided for moving carriage 17 back and forth along track 21 and is preferably pneumatically powered from a source of compressed air. First actuating means 78 preferably includes the following components, and is operable in the following manner: A double-acting jack 79, which includes the usual cylindrical housing 81 and piston rod 83, interengagingly connects frame 19 and carriage 17. Jack 79 is preferably mounted subjacently and centrally of carriage 17 with cylindrically housing 81 disposed downwardly and piston rod 83 extending upwardly. Jack 79 is fixedly attached adjacent the bottom end thereof by threaded fastener 85 which extends through an aperture provided in the midportion of cross-member 32. A bracket 87, preferably of plate material, projects downwardly from and is fixedly attached to the upright part 41 of carriage 17. The threaded end portion of piston rod 83 extends through an aperture provided in the lower portion of bracket 87 and is fixedly attached thereto by a nut 89. Upper and lower conduit means 91 (partially shown) and suitable hand-operable valve control means (not shown) connect jack 79 to a source of compressed air for the controlled to and fro movement of carriage 17 along track 21.

Second actuating means is provided for moving the pair of kerfing saw blades 55 outwardly from track 21 and across the blade paths of mitering saw blades 49. Second actuating means 92 preferably includes the following, and is operable in the following manner: A runner plate 93 is attached along the inside surface of the left one of angular frame members 31. Runner plate 93 is substantially of rectangular shape and is preferably provided with a pair of slotted apertures 95. Threaded fasteners 97 extend through apertures 95 and through apertures provided in angular frame member 31, and adjustably attach runner plate 93 to angular frame member 31.

In connection with the foregoing, it should be pointed out that, in the example given, second actuating means 92 includes in general runner plate 93, roller 105 and lever 103, and the related minor parts, although, it will be understood, that other equivalent actuating means may be employed without departing from the spirit and scope of the present invention. The upper portion of runner plate 93 preferably includes a first surface 99 and a second surface 101. Surface 99 extends substantially vertically and approximately at a 45 degree angle relative to the top surface of angular member 31. Second surface 101 intersects surface 99 and is disposed substantially parallel to the top surface of angular member 31.

A lever 103 is provided and is fixedly attached at one end thereof to the outer end of a pivot shaft 61. The other end of lever 103 is provided with a roller 105 rollingly mounted on shaft 107 extending perpendicularly from lever 103. Pivot shaft 61 is turnably mounted in bearings 59 attached to carriage 17 and is keyed by suitable means, not shown, to pivot shaft bearing 57 of support structure 53. Thus, lever 103 and support structure 53 are fixedly connected and are pivotable together. A helical tension spring 109 yieldably connects the upper portion of support structure 53 to carriage 17. Spring 109 yieldably urges kerfing saw blades 55 from workpieces W and roller 105 against a respective supporting surface of runner plate 93 or angular frame member 31.

Machine 11 is sequentially operable to first severingly miter the end of workpiece W on the initial movement of carriage 17 by first actuating means 78 and then, on continued movement of carriage 17 and with the outward movement of kerfing saw blades 55 by the second actuating means 92, to kerf cut workpiece W along the cut made by mitering saw blades 49.

In the drawings, carriage 17 is shown in the upward position after having mitered and kerfed the workpieces of material; however, it will be understood that when the mitering and kerfing mechanisms are in the starting positions, the respective mitering and kerfing saws thereof are disposed below workpieces W, and the bottom and edges of cylindrical tube members 47 of carriage 17 are in abutment with the lower pair of brackets 45 of track 21.

The work positioning means and the work clamping means of machine 11 are substantially the same as those disclosed in my said Patent No. 2,917,089 and briefly are as follows: A pair of pneumatically operable jacks 111 are oppositely disposed along the respective right and left edge portions of table member 35. Rubber padded clamp shoes 113 are fixedly attached respectively to the distal ends of piston rods 115 of jacks 111. Compression springs, not shown, housed respectively in jacks 111, retractably urge piston rods 115 and clamp shoes 113 outwardly from the respective workpieces W. Compressed air, as from the air source of first actuating means and jack 79, is fed through a control valve, not shown, and into the respective conduit means 117 of jacks 111. Manipulation of the control valve for jacks 111 selectively moves the respective piston rods 115 inward and outward and releasably clamps simultanteosuly the pair of workpieces W.

It is thought that from the foregoing description of parts, the use and operation of the device has become apparent. However, for completeness of disclosure, the use of the machine 11 in processing two particular workpieces W of material will be further described, as follows: With the manipulation of the air jack control valve, not shown, a pair of workpieces W are clamped in back-to-back relationship along rail member 37 and along the top surface of table member 35. After the workpieces are positionably clamped, the carriage control valve, not shown, is moved to a first position, thus directing the compressed air into the lower conduit 91 and into the lower portion of jack 79. The air in jack 79 moves carriage 17 upwardly along track 21, and moves the mitering saw blades 49 past workpieces W, and miteringly cuts the ends therefrom. At the same time, roller 105 has been rolling along the upper surface of angular member 31 and held thusly by spring 109. Just after mitering saw blades 49 cut the ends from workpieces W, roller 105 rollingly engages the first vertically inclined surface 99 of runner plate 93. As roller 105 rolls upwardly along surface 99, lever 103, through pivot shaft 61, moves support structure 53 and kerfing saw blades 55 outward against the tension of spring 109. As kerfing saw blades 55 move outwardly, they engage the midportion of the mitered end cut left by the mitering saw blades 49 and kerf cut the respective ends of workpieces W. With continued movement of carriage 17, roller 105 engages the second surface 101 of runner plate 93, and with further movement of carriage 17 kerfing saw blades 55 move on through the workpieces W and completely form the kerf cut K. The carriage control valve, not shown, is then moved to a second position, thus directing the air to enter through the upper conduit 91 of jack 79 and to move the kerfing and mitering saw means retraceably downwardly through the respective workpieces and to move carriage 17 again to the initial starting position. The air control valve of clamping jacks 111 is then opened, thus allowing the springs of the respective jacks to retractably move the respective piston rods 115 and the respective clamp shoes 113 away from workpieces W, thus permitting the removal of the workpieces from the machine.

The depth of kerf cut K in the respective ends of workpieces W can be determined by the adjustment of runner plate 93 and by the manipulation of threaded fasteners 97 and the selected positioning of plate 93. Thus, as can be seen in FIG. 1, the height of the second surface 101 above the upper surface of angular member 31 can be adjusted, and this adjustment determines the depth of the kerf cut formed in the workpieces of material.

From the foregoing, it is readily apparent that the machine of the present invention provides a relatively simple and very practical device for quickly and accurately processing the ends of two pieces of material to be joined with a splined miter joint.

Although the present invention has been described and illustrated with respect to a preferred embodiment thereof, it is to be understood that it is not to be so limited since changes and modifications may be made therein which are within the full intended scope of this invention as hereinafter claimed.

I claim:

1. A machine for mitering and kerfing the ends of elongated workpieces comprising a frame, workpiece support and guide structure for positioning a workpiece on said frame, a track secured to said frame and extending angularly of said support and guide structure and of the workpiece, a carriage mounted from said track and movable in forward or rearward directions, mitering saw means mounted to said carriage adjacent the forward end thereof, kerfing saw means movably mounted from said carriage rearwardly of said mitering saw means and movable outwardly from said track, first actuating means for moving said carriage along said track, and second actuating means for moving said kerfing saw means outwardly away from said track.

2. The machine of claim 1 in which said second actuating means includes means responsive to operation of said first actuating means.

3. A machine for mitering and kerfing the ends of elongated workpieces comprising a frame, workpiece support and guide structure for positioning a workpiece on said frame, a track secured to said frame and extending angularly of said support and guide structure and of the workpiece, a carriage mounted from said track movable in forward or rearward directions, mitering saw means mounted to said carriage adjacent the forward end thereof, kerfing saw means, pivot means mounting said kerfing saw means from said carriage for pivotal movement of said kerfing saw means outwardly of said track, first actuating means for moving said carriage along said track, second actuating means responsive to operation of said first actuating means for moving said kerfing saw means outwardly away from said track and toward and beyond the path of the saw of said mitering saw means, said machine being sequentially operable to first severingly miter the end of the workpiece upon initial forward movement of said carriage by said first actuating means and then upon continued movement of said carriage and with the outward movement of the kerfing saw by said second actuating means to kerf the workpiece along the cut of the mitering saw.

4. The machine of claim 3 in which said second actuating means comprises a runner attached from said frame having a surface inclined relative to said track, and means co-acting between said surface and said kerfing saw means for pivotally moving said kerfing saw means outwardly of said track.

5. A machine for mitering and kerfing the ends of elongated workpieces comprising a frame, workpiece support and guide structure for positioning a workpiece on said frame, a track secured to said frame and extending angularly of said support and guide structure and of the workpiece, a carriage mounted from said track and movable along a path in forward or rearward directions; mitering saw means fixedly mounted to said carriage adjacent the forward end thereof and comprising a mitering saw blade disposed substantially flat and parallel with the path of said carriage, and electric motor means supported from said carriage mounting and driving said mitering saw blade; kerfing saw means movably mounted from said carriage rearwardly of said mitering saw, means comprising a support structure, means movably mounting said support structure from said carriage, a kerfing saw blade rotatably mounted from said support structure, and electric motor means supported from said support structure drivingly engaging said kerfing saw blade; first actuating means for moving said carriage along said track, and second actuating means for moving said kerfing saw means outwardly away from said track, said machine being sequentially operable to first severingly miter the end of the workpiece on initial movement of said carriage by said first actuating means and then on continued movement of said carriage and with the outward movement of said kerfing saw by second actuating means to kerf the workpiece along the cut of said mitering saw.

6. The machine of claim 5 in which said second actuating means comprises a runner fixedly attached from said frame and having a surface inclined relative to the path of said carriage, a lever fixedly secured at one end thereof to said support structure, and a roller mounted at the other end of said lever rollingly engaging said surface of said runner upon forward movement of said carriage.

7. A machine for mitering and kerfing the ends of elongated workpieces comprising a frame, workpiece supporte and guide structure for positioning a workpiece on said frame, mitering saw means including a substantially flat mitering saw blade, kerfing saw means including a kerfing saw blade, disposed substantially perpendicular to said mitering saw blade, carriage means supporting said mitering saw means and said kerfing saw means for carrying said mitering saw blade in the plane of said mitering saw blade at an angle into cutting relationship with the workpiece to miter the end thereof and immediately after mitering the end carrying said kerfing saw blade past the mitered end; means coupled to said kerfing saw means for moving said kerfing saw blade, as it is carried past the mitered end, across the path of movement said mitering saw blade and into cutting relationship with the workpiece to kerf the end thereof.

References Cited by the Examiner
UNITED STATES PATENTS

| | | | |
|---|---|---|---|
| 2,800,932 | 7/1957 | Scott | 143—47 X |
| 2,917,089 | 12/1959 | Ennis | 143—47 X |

WILLIAM W. DYER, Jr., *Primary Examiner.*

W. D. BRAY, *Assistant Examiner.*